United States Patent
Ku et al.

(10) Patent No.: US 8,019,657 B2
(45) Date of Patent: Sep. 13, 2011

(54) METHOD FOR SEARCHING PRODUCTS INTELLIGENTLY BASED ON ANALYSIS OF CUSTOMER'S PURCHASING BEHAVIOR AND SYSTEM THEREFOR

(75) Inventors: Young Bae Ku, Seoul (KR); Jung Du Choi, Seoul (KR)

(73) Assignee: GMarket Inc., Seoul (KR)

( * ) Notice: Subject to any disclaimer, the term of this patent is extended or adjusted under 35 U.S.C. 154(b) by 74 days.

(21) Appl. No.: 12/159,215

(22) PCT Filed: May 23, 2006

(86) PCT No.: PCT/KR2006/001929
§ 371 (c)(1),
(2), (4) Date: Jun. 26, 2008

(87) PCT Pub. No.: WO2007/078033
PCT Pub. Date: Jul. 12, 2007

(65) Prior Publication Data
US 2008/0300910 A1    Dec. 4, 2008

(30) Foreign Application Priority Data
Jan. 5, 2006    (KR) .................. 10-2006-0001247

(51) Int. Cl.
*G06Q 30/00* (2006.01)
*G06F 17/30* (2006.01)
(52) U.S. Cl. ....... 705/26.7; 705/27.1; 707/748; 707/752
(58) Field of Classification Search .......... 705/26, 705/27; 707/748, 752
See application file for complete search history.

(56) References Cited

U.S. PATENT DOCUMENTS

| | | | |
|---|---|---|---|
| 6,421,675 B1 * | 7/2002 | Ryan et al. | 1/1 |
| 6,785,671 B1 * | 8/2004 | Bailey et al. | 707/3 |
| 6,978,263 B2 | 12/2005 | Soulanille | |
| 7,092,936 B1 * | 8/2006 | Alonso et al. | 707/737 |
| 7,152,061 B2 * | 12/2006 | Curtis et al. | 1/1 |
| 7,152,064 B2 * | 12/2006 | Bourdoncle et al. | 1/1 |
| 7,617,205 B2 * | 11/2009 | Bailey et al. | 1/1 |
| 7,653,623 B2 * | 1/2010 | Kashima et al. | 707/715 |

(Continued)

FOREIGN PATENT DOCUMENTS
KR    2003-0016037    2/2003
(Continued)

OTHER PUBLICATIONS
International Search Report.
(Continued)

*Primary Examiner* — Jeffrey A Smith
*Assistant Examiner* — Courtney Stopp
(74) *Attorney, Agent, or Firm* — Fay Sharpe LLP; Richard M. Klein

(57) ABSTRACT

A system for searching products intelligently based on analysis of customer's purchasing behavior includes a search engine database, a product database configured to store a predetermined number of keyword information on each product, an input/output unit configured to receive keywords, product selection or order information, and output search results, a search unit configured to generate search results of the search engine database and the product database from the keywords, and a related keyword information update unit configured to update related keyword information of the product database depending on the product selection or the order information.

14 Claims, 2 Drawing Sheets

U.S. PATENT DOCUMENTS

| | | | |
|---|---|---|---|
| 7,840,569 B2 * | 11/2010 | Meyerzon et al. | 707/748 |
| 7,870,147 B2 * | 1/2011 | Bailey et al. | 707/767 |
| 2004/0019536 A1 * | 1/2004 | Ashkenazi et al. | 705/27 |
| 2004/0199419 A1 * | 10/2004 | Kim et al. | 705/14 |
| 2007/0100804 A1 * | 5/2007 | Cava | 707/3 |
| 2007/0168344 A1 * | 7/2007 | Brinson et al. | 707/5 |

FOREIGN PATENT DOCUMENTS

| | | |
|---|---|---|
| KR | 2004-0069821 | 8/2004 |
| WO | 2004019171 A2 | 3/2004 |

OTHER PUBLICATIONS

Junping et al., "Research on Knowledge Base System Based Intelligent Search Engine", 2005.

Chinese Office Action issued Feb. 12, 2010.

"Rakuten, The 100 Stores of "EC with Ease" from 50,000 ¥ a Month Are Lined Side by Side", NIHON KEIZAI MULTIMEDIA, The March Issue 2009.

Sasaki Toshinao "Enterprise Search Technology for helping business to search 'real valuable information'", pp. 52-63, No. 6, vol. 2, COMPUTERWORLD Get Technology Right (Jun. 1, 2005), IDG Japan Corporation in Japan.

English Translation of Sasaki Toshinao "Enterprise Search Technology for helping business to search 'real valuable information'", pp. 52-63, No. 6, vol. 2, COMPUTERWORLD Get Technology Right (Jun. 1, 2005), IDG Japan Corporation in Japan.

\* cited by examiner

[Fig. 1]
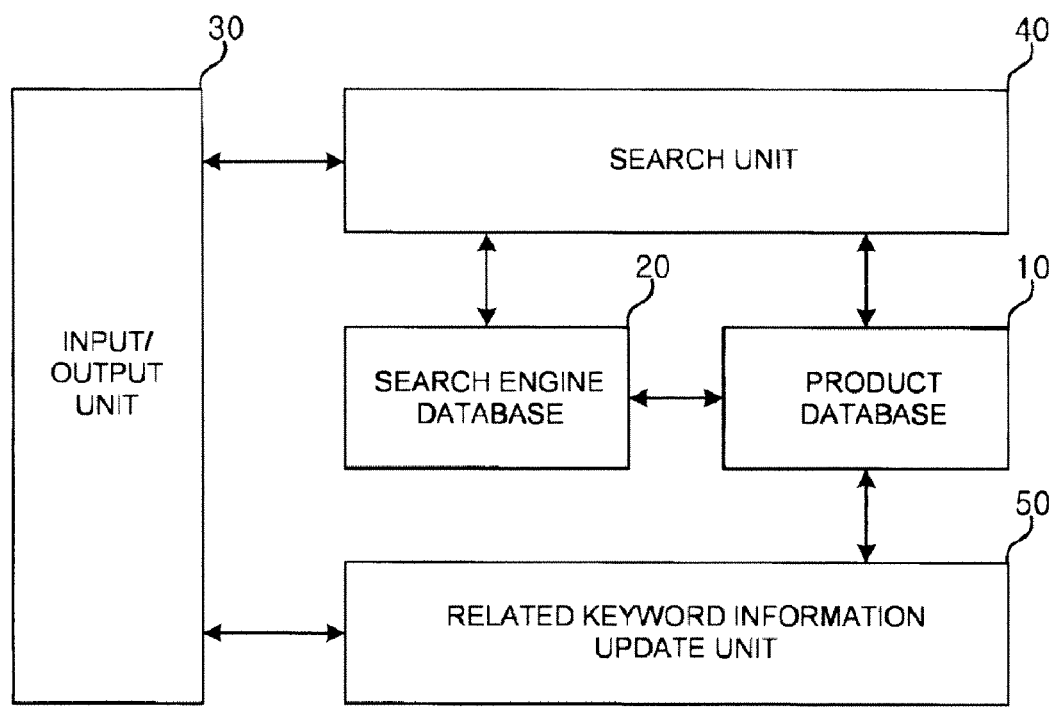

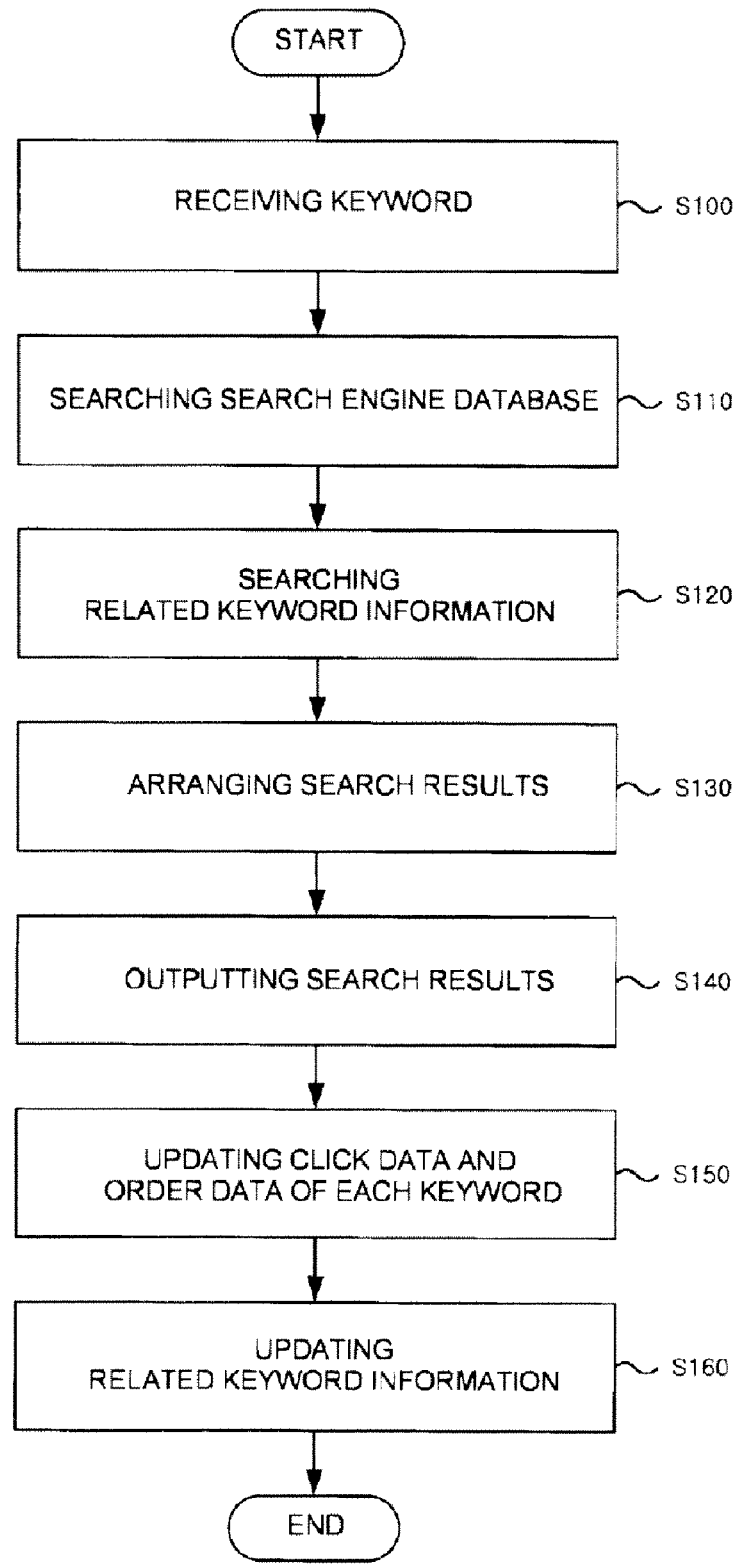
[Fig. 2]

United States Patent US 8,019,657 B2

METHOD FOR SEARCHING PRODUCTS INTELLIGENTLY BASED ON ANALYSIS OF CUSTOMER'S PURCHASING BEHAVIOR AND SYSTEM THEREFOR

TECHNICAL FIELD

The present invention generally relates to a method for searching products intelligently based on analysis of customer's purchasing behavior and a system therefor. More specifically, the present invention relates to searching products based on analysis of customer's purchasing behavior by adding information on relationship between inputted keywords and selected products by the customer to a search engine for an electronic commerce web site so as to provide more precise and intelligent product searching service.

BACKGROUND ART

In a conventional web site (e.g., internet shopping mall) for providing electronic commerce service, a search engine accesses a database with product names, brand names, product descriptions, manufacturers and seller names via natural language/morpheme analysis and synonym dictionary to provide search results classified by weight value of each item above.

However, the conventional method is vulnerable to search of new product names or model names different from standard words because it depends on information previously registered in the analysis algorithm of natural language/morpheme and the synonym dictionary.

In order to search these products, continuous updating on new keywords or information has been required. As a result, there was a problem to output inaccurate information or insignificant search results when continuous updating was not provided.

DISCLOSURE OF INVENTION

Technical Solution

Various embodiments of the present invention are directed at providing a system for searching products intelligently based on analysis of customer's purchasing behavior. The system includes a search engine database, a product database configured to store a predetermined number of keyword information on each product, an input/output unit configured to receive keywords, product selection or order information, and output search results, a search unit configured to generate search results of the search engine database and the product database from the keywords, and a related keyword information update unit configured to update related keyword information of the product database depending on the product selection or the order information.

Also, various embodiments of the present invention are directed at providing a method for searching products intelligently based on analysis of customer's purchasing behavior. The method comprises the steps of: receiving keywords from a customer; outputting search results where search results of a search engine database on the keywords and search results obtained from related keyword information of each product stored in a product database are arranged depending on an algorithm for arranging search results; updating click data of each keyword when the customer selects a product and order data of each keyword when the customer orders the product; and calculating priority values depending on an algorithm for calculating priority values from the click data of each keyword and the order data of each keyword on each product to update related keyword information of each product stored in the product database.

BRIEF DESCRIPTION OF THE DRAWINGS

Other aspects and advantages of the present invention will become apparent upon reading the following detailed description and upon reference to the drawings in which:

FIG. 1 is a block diagram illustrating a system for searching products according to an embodiment of the present invention; and FIG. 2 is a flow chart illustrating a method for searching products according to an embodiment of the present invention.

BEST MODE FOR CARRYING OUT THE INVENTION

The present invention will be described in detail with reference to the accompanying drawings. Wherever possible, the same reference numbers will be used throughout the drawings to refer to the same or like parts.

FIG. 1 is a block diagram illustrating a system for searching products according to an embodiment of the present invention.

Referring to FIG. 1, the system includes a product database 10, a search engine database 20, an input/output unit 30, a search unit 40 and a related keyword information update unit 50.

The product database 10 stores serial numbers, classifications, product names, brand names, manufacturer names, seller names, firm names, product descriptions, product properties, prices, stock quantities, shipping methods and promotion information of each product.

The product database 10 also stores a related keyword list of each product. The related keyword list, which includes a predetermined number of related keywords, stores click data that value for each related keyword.

For example, Tables 1 and 2 show the related keyword lists of products C and D respectively.

TABLE 1

Related keyword list of product C

| Related keyword | Click data (T1) | Order data (T2) | Priority value |
|---|---|---|---|
| KW1 | 4 | 1 | 0.19 |
| KW2 | 5 | 3 | 0.36 |

TABLE 2

Related keyword list of product D

| Related keyword | Click data (T1) | Order data (T2) | Priority value |
|---|---|---|---|
| KW2 | 6 | 2 | 0.32 |
| KW3 | 3 | 1 | 0.16 |

The search engine database 20 stores information required in natural language/morpheme analysis, analysis of synonym dictionary and searching based on marketing information. The search engine database 20 may access the product database 10.

The input/output unit 30 receives keywords, product selection or order information, and outputs search results.

The search unit 40 generates arranged search results of the search engine database 20 and the product database 10 from the keywords.

The search unit 40 searches the search engine database 20 based on the keywords by natural language/morpheme analysis, analysis of synonym dictionary and searching based on marketing information to obtain a product list which includes a pre-determined number of products having high priority values.

The search unit 40 also searches related keyword information of each product stored in the product database 10 based on the keywords to obtain a product list which includes a predetermined number of products having high priority values.

Referring to Tables 1 and 2, when the keyword is KW2, products including KW2 in the related keywords such as products C and D are searched.

The search unit 40 multiplies priority values of each product in the product list obtained from search of the search engine database 20 and priority values of each product in the product list obtained by search using related keyword information of each product stored in the product database 10 by each weight value and sums up the multiplied values so as to arrange the product search results in descending order according to the summed values.

The weight value can be adjusted depending on preference between search using related keyword information of the product database 10 and search using the search engine database 20.

As the click data that are click numbers of customers on each related keyword of the product database 10 and the order data that are order numbers of customers are accumulated, priority values of the related keyword list of each product stored in the product database 10 become larger. Therefore, the weight value is required to be adjusted under consideration of the above-described effect.

Suppose that the priority value of each product of the product list obtained from search of the search engine database 20 is S1, and the priority value of each product of the product list obtained from search depending on related keyword information of each product stored in the product database 10 is S2. Also, suppose that the weight value by search of the search engine database 20 is Pt, and the weight value by search depending on related keyword information is P2. Then, the priority value of each searched product can be obtained from S1*P1+S2*P2 (Equation 1).

For example, suppose that products A, B, C and D are searched by search of the search engine database 20, and products C, D and E are searched by search depending on related keyword information when the keyword is KW2. When the weight value P1 by search of the search engine database 20 is 0.4 and the weight value P2 by search depending on related keyword information is 0.6, the priority value of each searched product may be obtained from Equation 1. Table 3 shows the calculated priority values.

TABLE 3

Calculated priority values of each product

|  | Search of search engine DB(S1) | Search depending on related keyword information (S2) | Calculated priority value |
|---|---|---|---|
| Proudct A | 0.50 |  | 0.200 |
| Proudct B | 0.30 |  | 0.120 |
| Proudct C | 0.20 | 0.36 | 0.296 |
| Proudct D | 0.10 | 0.32 | 0.232 |
| Proudct E |  | 0.10 | 0.060 |

The related keyword information update unit 50 updates related keyword information in the product database 10 depending on the product selection or the order information.

For example, when the product D is selected and ordered, the click data of the product D of Table 2 is updated from 6 to 7, and the order data of the product D is updated from 2 to 3.

The related keyword information update unit 50 multiplies the click data of each keyword and the order data of each keyword which are updated depending on the product selection or the order information by each weight value to calculate priority values.

The weight value can be adjusted depending on preference between the click data of each keyword and the order data of each keyword.

Suppose that the click data of each keyword is T1 and the order data of each keyword is T2. Also, suppose that the weight value of the click data of each keyword is Q1 and the weight value of the order data of each keyword is Q2. The priority value of the updated related keyword information of the product stored in the product database 10 may be obtained from T1*Q1+T2*Q2 (Equation 2).

For example, if the product D is selected and ordered when the keyword is KW2, the click data of the product D in Table 2 is updated from 6 to 7, and the order data of the product D is updated from 2 to 3. Also, suppose that the weight value Q1 of the click data of each keyword is 0.03, and the weight value Q2 of the order data of each keyword is 0.07. Then, the priority value is calculated from Equation 2, and updated from 0.32 to 0.42.

The product database 10 may further include the number of recent update on related keywords of each product.

The related keyword information update unit 50 may delete related keywords where priority values and the number of recent update are low.

Also, the related keyword information update unit 50 may add new keywords that are not searched from related keyword information of the product database 10 to a related keyword list.

FIG. 2 is a flow chart illustrating a method for searching products according to an embodiment of the present invention.

Referring to FIG. 2, a specific keyword is received from a customer (S100).

Based on the keyword, the search engine database 20 is searched by natural languages/morpheme analysis, analysis of synonym dictionary and searching based on marketing information so that a product list which includes a predetermined number of products having high priority values is obtained (S110).

The related keyword information of each product stored in the product database 10 based on the keyword is searched, so that a product list which includes a pre-determined number of products having high priority values is obtained (S120).

Referring to Tables 1 and 2, when the keyword is KW2, products including the related keyword KW2 such as the products C and D are searched.

The search results of the search engine database 20 on the keyword and the search results depending on related keyword information of each product stored in the product database 10 are arranged depending on the algorithm for arranging search results (S130).

According to the algorithm for arranging search results, the priority values of each product of the product lists obtained from search of the search engine database 20 and the priority values of each product of the product lists obtained from search depending on related keyword information of each product stored in the product database 10 are multiplied by each weight value and summed up, so that the product search results are arranged in descending order by the summed values.

The arranged search results are outputted (S140).

When a customer selects a product in the search results, the click data of each keyword are updated. Also when a customer orders a product in the search results, the order data of each keyword are updated (S150).

The priority values are calculated from the click data of each keyword and the order data of each keyword in each product according to the algorithm for calculating priority values, so that related keyword information of each product stored in the product database 10 are updated (S160).

According to the algorithm for calculating priority values, the click data of each keyword and the order data of each keyword are multiplied by each weight value, so that the priority values are calculated.

In each product, related keywords where the priority values and the number of recent update are low may be deleted.

Also, new keywords that are not searched from related keyword information of the product database 10 may be added to the related keyword list.

INDUSTRIAL APPLICABILITY

As described above, according to a method for searching products using related keyword information and system therefor, information on relationship between selected products and inputted keywords by a customer is added to a search engine for an electronic commerce web site to analyze purchasing behavior of the customer, so that more precise and intelligent product searching service can be provided to the customer.

The foregoing description of various embodiments of the invention has been presented for purposes of illustration and description. It is not intended to be exhaustive or to limit the invention to the precise form disclosed, and modifications and variations are possible in light of the above teachings or may be acquired from practice of the invention. Thus, the embodiments were chosen and described in order to explain the principles of the invention and its practical application to enable one skilled in the art to utilize the invention in various embodiments and with various modifications as are suited to the particular use contemplated.

The invention claimed is:

1. A system for searching products intelligently based on analysis of customer's purchasing behavior, the system comprising:
   a computer accessible search engine database embedded in a computer memory;
   a computer accessible product database configured in a computer memory to store a finite predetermined number of related keyword information for each individual product, the related keyword information including click data, order data and a first priority value for each individual related keyword;
   a computer accessible input unit configured to receive keywords, product selection or order information;
   a computer processor based search unit configured to perform a search of the search engine database based on natural language, synonym, and morpheme analysis of the received keyword which creates a second priority value and search of the product database based on an analysis of the related keyword information with the received keywords so as to get search results;
   an algorithm embedded in a computer processor for arranging the search results, comprising the steps of:
      tabulating the total number of clicks made on the website link to a product to compute the total clicks;
      multiplying the total clicks data by a weighting factor to compute a weighted total clicks;
      tabulating the total number of clicks made on the website link that resulted in a purchase to compute total purchase clicks;
      multiplying the total purchase clicks by another separate weighting factor to compute a weighted total purchased clicks;
      adding the weighted total clicks to the weighted total purchased clicks to update the first priority value;
      multiplying the updated first priority value by another separate weighting factor to compute a weighted first priority value;
      multiplying the second priority value by another separate weighting factor to compute a weighted second priority value; and
      adding the weighted first priority value to the weighted second priority value to calculate a summed value for arranging the search results by the summed value; and
   a computer operable output unit configured to output the arranged search results.

2. The system according to claim 1, wherein the related keyword information of the product database further comprises the number of recent update for each related keyword.

3. The system according to claim 2, wherein the algorithm further comprises deleting information for related keywords that have low first priority values and low number of recent updates with respect to said individual product.

4. The system according to claim 1, wherein the algorithm further comprises adding new keywords that cannot be searched by using the related keyword information to the product database.

5. The system of claim 1, wherein the arranged search results are outputted in descending order.

6. The system of claim 1, wherein the weighting factor may be adjusted by a user.

7. A method for transforming an analysis of a customer's behavior into an Internet keyword search category, the method comprising the steps of:
   receiving keywords from a customer through the use of a computer operable interface;
   performing a search of a product database based on an analysis of related keyword information that is stored in the product database with a finite predetermined number and includes click data, order data, a first priority value for each individual related keywords with the received keywords, and search of a computer accessible search engine database embedded in a computer memory based on natural language, synonym and morpheme analysis of the received keywords, which creates a second priority values so as to get search results;

arranging the search results by an algorithm embedded in a computer processor comprising the steps of:
  tabulating the total number of clicks made on the website link to a product to compute the total clicks;
  multiplying total clicks data by a weighting factor to compute a weighted total clicks;
  tabulating the total number of clicks made on the website link that resulted in a purchase to compute total purchase clicks;
  multiplying total purchase clicks by another separate weighting factor to compute a weighted total purchase clicks;
  adding the weighted total clicks to the weighted total purchased clicks to update the first priority value;
  multiplying the updated first priority value by another separate weighting factor to compute a weighted first priority value;
  multiplying the second priority value by another separate weighting factor to compute a weighted second priority value;
  adding the weighted first priority value to the weighted second priority value to calculate a summed value and produce search results arranged by the summed value; and
outputting the arranged search results to an output display.

8. The method according to claim 7, wherein the product database further comprises the number of recent update for each related keyword of each product.

9. The method according to claim 8, the algorithm further comprising deleting related keywords where the first priority values and the number of recent update are low.

10. The method according to claim 7, the algorithm further comprising adding new keywords that cannot be searched by using the related keyword information of the product database.

11. The method of claim 7, wherein the weighting factor may be adjusted by a user.

12. A method of searching the Internet for products intelligently by transforming a customer's purchasing behavior into an Internet keyword search category containing a priority value, the method comprising:
  receiving a keyword entered by a user into a computer operable input device;
  performing a search for the keyword in a product database, and a search of a search engine database based on natural language, synonyms, morpheme analysis of the received keywords, which creates a search engine value, so as to get search results by using a search unit;
  displaying an arranged search result list of Internet websites associated with the keyword on a computer operable output device;
  recording each instance where a user clicks on a link contained on a selected product website link as click data in the product database;
  recording each instance where the user click on the selected product website link is followed by a user ordering the product from the website link as order data in the product database;
  updating the arranged search result list for the keyword using a computer processor embedded with an algorithm for arranging the search results, the algorithm comprising the steps of:
    summing total number of instances where a user clicks on the selected website link to a product to compute the total clicks;
    multiplying the total clicks by a weighting factor to compute a weighted total clicks;
    summing the total number of instances where a user clicks on the website link that resulted in a purchase to compute total purchase clicks;
    multiplying the total purchase clicks by another separate weighting factor to compute a weighted total purchased clicks;
    adding the weighted total clicks to weighted total purchased clicks to compute a keyword priority value;
    multiplying the keyword priority value by another separate weighting factor to compute a weighted keyword priority value;
    multiplying the search engine value by another separate weighting factor to compute a weighted search engine value; and
    adding the weighted keyword priority value to the weighted search engine value to calculate a summed value for updating the arranged search result list; and
  updating the stored total clicks, total purchase clicks, and keyword priority value related keyword information in the said product database by deleting initial values used during the initial search and saving the updated values as the new stored total clicks, total purchase clicks, and keyword priority values.

13. The method according to claim 12, wherein the keywords that have low priority values and low number of recent updates with respect to said individual product are deleted from the product database.

14. The method according to claim 12, wherein the keyword that does not currently exist in the database is added to the database along with related keyword information.

* * * * *